US011102138B2

(12) United States Patent
Krishan et al.

(10) Patent No.: US 11,102,138 B2
(45) Date of Patent: Aug. 24, 2021

(54) METHODS, SYSTEMS, AND COMPUTER READABLE MEDIA FOR PROVIDING GUARANTEED TRAFFIC BANDWIDTH FOR SERVICES AT INTERMEDIATE PROXY NODES

(71) Applicant: Oracle International Corporation, Redwood Shores, CA (US)

(72) Inventors: Rajiv Krishan, Bangalore (IN); Rajdeep Yadav, Gurgaon (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 114 days.

(21) Appl. No.: 16/601,371

(22) Filed: Oct. 14, 2019

(65) Prior Publication Data

US 2021/0112012 A1     Apr. 15, 2021

(51) Int. Cl.
*H04L 12/823* (2013.01)
*H04L 12/801* (2013.01)
(Continued)

(52) U.S. Cl.
CPC .............. *H04L 47/32* (2013.01); *H04L 47/11* (2013.01); *H04L 47/22* (2013.01);
(Continued)

(58) Field of Classification Search
None
See application file for complete search history.

(56) References Cited

U.S. PATENT DOCUMENTS 5,084,816 A    1/1992   Boese et al.
5,253,248 A    10/1993   Dravida et al.
(Continued)

FOREIGN PATENT DOCUMENTS

WO    WO 2006/096597 A2    9/2006
WO    WO 2007/126352 A1    11/2007
(Continued)

OTHER PUBLICATIONS

Communication pursuant to Article 94(3) EPC for European Patent Application Serial No. 17 772 559.5 (dated Nov. 13, 2020).
(Continued)

*Primary Examiner* — Anh Ngoc M Nguyen
(74) *Attorney, Agent, or Firm* — Jenkins, Wilson, Taylor & Hunt, P.A.

(57) ABSTRACT

A method for providing guaranteed minimum intermediate proxy node bandwidth for services includes configuring, at an intermediate proxy node, a guaranteed minimum bandwidth of the intermediate proxy node reserved to process messages associated with a service. The method further includes receiving a first message at the intermediate proxy node. The method further includes determining, by the intermediate proxy node, that the intermediate proxy node is in an overloaded state. The method further includes identifying, by the intermediate proxy node, the first message as being associated with the service for which the guaranteed minimum bandwidth is configured. The method further includes determining, by the intermediate proxy node, that a portion of the guaranteed minimum bandwidth for the service is available to process the first message. The method further includes routing, by the intermediate proxy node and to a producer network function (NF) that provides the service, the first message and updating a message count for the service.

20 Claims, 5 Drawing Sheets

(51) Int. Cl.
*H04L 12/815* (2013.01)
*H04L 12/851* (2013.01)
*H04L 12/859* (2013.01)
*H04L 12/835* (2013.01)
*H04W 28/02* (2009.01)
*H04W 28/20* (2009.01)

(52) U.S. Cl.
CPC ...... *H04L 47/2433* (2013.01); *H04L 47/2475* (2013.01); *H04L 47/29* (2013.01); *H04L 47/30* (2013.01); *H04W 28/0268* (2013.01); *H04W 28/0289* (2013.01); *H04W 28/20* (2013.01)

(56) References Cited

U.S. PATENT DOCUMENTS

| | | |
|---|---|---|
| 5,915,013 A | 6/1999 | Mintz et al. |
| 5,933,474 A | 8/1999 | Kipp |
| 6,018,515 A | 1/2000 | Sorber |
| 6,115,383 A | 9/2000 | Bell et al. |
| 6,212,164 B1 | 4/2001 | Murakami et al. |
| 6,215,765 B1 | 4/2001 | McAllister et al. |
| 6,606,379 B2 | 8/2003 | Khadri et al. |
| 6,704,287 B1 | 3/2004 | Moharram |
| 6,747,955 B1 | 6/2004 | Archer |
| 6,839,423 B2 | 1/2005 | Khadri et al. |
| 6,996,225 B1 | 2/2006 | Bordonaro et al. |
| 7,324,451 B2 | 1/2008 | Hanif et al. |
| 8,014,510 B2 | 9/2011 | Bordonaro et al. |
| 8,547,846 B1 | 10/2013 | Ma et al. |
| 8,903,074 B2 | 12/2014 | Delaney et al. |
| 9,112,784 B2 | 8/2015 | Chen et al. |
| 10,291,539 B2 | 5/2019 | Krishan et al. |
| 10,299,128 B1 | 5/2019 | Suthar et al. |
| 10,361,843 B1 | 7/2019 | Suthar et al. |
| 10,595,256 B1 | 3/2020 | Marupaduga et al. |
| 10,609,154 B2 | 3/2020 | Talebi Fard et al. |
| 10,616,934 B2 | 4/2020 | Talebi Fard et al. |
| 10,778,527 B2 | 9/2020 | Assali et al. |
| 2001/0049730 A1 | 12/2001 | Brendes et al. |
| 2002/0093910 A1* | 7/2002 | Yazaki ................ H04L 47/22 370/229 |
| 2005/0144309 A1* | 6/2005 | Gish ................ H04L 47/28 709/233 |
| 2006/0198508 A1 | 9/2006 | Delaney et al. |
| 2007/0237074 A1 | 10/2007 | Curry |
| 2011/0239226 A1 | 9/2011 | Placanica |
| 2013/0029708 A1 | 1/2013 | Fox et al. |
| 2014/0328172 A1 | 11/2014 | Kumar et al. |
| 2016/0104377 A1 | 4/2016 | French et al. |
| 2016/0352588 A1 | 12/2016 | Subbarayan et al. |
| 2018/0057368 A1 | 3/2018 | Hubrig et al. |
| 2018/0083882 A1 | 3/2018 | Krishan et al. |
| 2018/0324646 A1 | 11/2018 | Lee et al. |
| 2018/0343567 A1 | 11/2018 | Ashrafi |
| 2019/0045351 A1 | 2/2019 | Zee et al. |
| 2019/0075552 A1 | 3/2019 | Yu et al. |
| 2019/0116486 A1 | 4/2019 | Kim et al. |
| 2019/0116521 A1 | 4/2019 | Qiao et al. |
| 2019/0158364 A1 | 5/2019 | Zhang et al. |
| 2019/0173740 A1 | 6/2019 | Zhang et al. |
| 2019/0174561 A1 | 6/2019 | Sivakeesar |
| 2019/0182875 A1 | 6/2019 | Talebi Fard et al. |
| 2019/0191348 A1 | 6/2019 | Futaki et al. |
| 2019/0191467 A1 | 6/2019 | Dao et al. |
| 2019/0223093 A1 | 7/2019 | Watfa et al. |
| 2019/0261244 A1 | 8/2019 | Jung et al. |
| 2019/0306907 A1 | 10/2019 | Andreoli-Fang et al. |
| 2019/0313236 A1 | 10/2019 | Lee et al. |
| 2019/0313437 A1 | 10/2019 | Jung et al. |
| 2019/0313469 A1 | 10/2019 | Karampatsis et al. |
| 2019/0335002 A1 | 10/2019 | Bogineni et al. |
| 2019/0335534 A1 | 10/2019 | Atarius et al. |
| 2019/0342921 A1 | 11/2019 | Loehr et al. |
| 2019/0349901 A1 | 11/2019 | Basu Mallick et al. |
| 2019/0357092 A1 | 11/2019 | Jung et al. |
| 2019/0380031 A1 | 12/2019 | Suthar et al. |
| 2019/0394624 A1 | 12/2019 | Karampatsis et al. |
| 2019/0394833 A1 | 12/2019 | Talebi Fard et al. |
| 2020/0008069 A1 | 1/2020 | Zhu et al. |
| 2020/0028920 A1 | 1/2020 | Livanos et al. |
| 2020/0045753 A1 | 2/2020 | Dao et al. |
| 2020/0045767 A1 | 2/2020 | Velev et al. |
| 2020/0053670 A1 | 2/2020 | Jung et al. |
| 2020/0053724 A1 | 2/2020 | MolavianJazi et al. |
| 2020/0053828 A1 | 2/2020 | Bharatia et al. |
| 2020/0059856 A1 | 2/2020 | Cui et al. |
| 2020/0084663 A1 | 3/2020 | Park et al. |
| 2020/0092423 A1 | 3/2020 | Qiao et al. |
| 2020/0092424 A1 | 3/2020 | Qiao et al. |
| 2020/0099629 A1* | 3/2020 | Wu ................ H04L 47/762 |
| 2020/0136911 A1 | 4/2020 | Assali et al. |
| 2021/0112443 A1 | 4/2021 | Krishan et al. |

FOREIGN PATENT DOCUMENTS

| | | |
|---|---|---|
| WO | WO 2012/065477 A1 | 5/2012 |
| WO | WO 2015/139726 A1 | 9/2015 |
| WO | WO-2018/057368 | 3/2018 |
| WO | WO 2018/174021 A1 | 9/2018 |
| WO | WO 2018/174516 A1 | 9/2018 |
| WO | WO 2019/034609 A1 | 2/2019 |
| WO | WO 2019/096586 A1 | 5/2019 |
| WO | WO 2019/154295 A1 | 8/2019 |
| WO | WO 2019/154476 A1 | 8/2019 |
| WO | WO 2019/220172 A1 | 11/2019 |

OTHER PUBLICATIONS

Examination Report for Indian Patent Application Serial No. 201947009631 (dated Oct. 22, 2020).

Commonly-assigned, co-pending U.S. Appl. No. 16/914,231 for "Methods, Systems, and Computer Readable Media for Rules-Based Overload Control for 5G Servicing," (Unpublished, filed Jun. 26, 2020).

Notice of Allowance and Fee(s) Due for U.S. Appl. No. 16/176,920 (dated Apr. 16, 2020).

Applicant-Initiated Interview Summary for U.S. Appl. No. 16/176,920 (dated Apr. 1, 2020).

Non-Final Office Action for U.S. Appl. No. 16/176,920 (dated Mar. 6, 2020).

"3rd Generation Partnership Project; Technical Specification Group Core Network and Terminals; 5G System; Session Management Policy Control Service; Stage 3 (Release 16)," 3GPP TS 29.512, V16.4.0, pp. 1-186 (Mar. 2020).

"5G; Procedures for the 5G System (3GPP TS 23.502 version 15.2.0 Release 15)," ETSI TS 123502 V15.2.0, pp. 1-46 (Jun. 2018).

Notification of Transmittal of the International Search Report and the Written Opinion of the International Searching Authority, or the Declaration for International Application Serial No. PCT/US2020/051885 (dated Dec. 18, 2020).

Commonly-assigned, co-pending U.S. Appl. No. 16/176,920 for "Methods, Systems, and Computer Readable Media for Providing a Service Proxy Function in a Telecommunications Network Core Using a Service-Based Architecture," (Unpublished, filed Oct. 31, 2018).

"3rd Generation Partnership Profect; Technical Specification Group Core Network and Terminals; 5G System; Network Function Repository Services; Stage 3 (Release 16)," 3GPP TS 29.510, V16.0.0, pp. 1-135 (Jun. 2019).

"3rd Generation Partnership Project; Technical Specification Group Core Network and Terminals; 5G System; Technical Realization of Service Based Architecture; Stage 3 (Release 16)," 3GPP TS 29.500, V16.0.0, pp. 1-36 (Jun. 2019).

Notice of Allowance and Fee(s) Due and Applicant-Initiated Interview Summary for U.S. Appl. No. 15/273,069 (dated Jan. 3, 2019).

Final Office Action for U.S. Appl. No. 15/273,069 (dated Sep. 14, 2018).

(56) References Cited

OTHER PUBLICATIONS

"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
Non-Final Office Action for U.S. Appl. No. 15/273,069 (dated Mar. 7, 2018).
Notification of Transmittal of the International Search Report and the Written Opinion of the International Searching Authority, or the Declaration for International Application No. PCT/US2017/051351 (dated Dec. 13, 2017).
Scholl et al., "An API First Approach to Microservices Development," Oracle, https://blogs.oracle.com/developers/an-api-first-approach-to-microservices-development, pp. 1-12 (Nov. 8, 2017).
Notice of Allowance and Fee(s) Due & Interview Summary for U.S. Appl. No. 11/071,946 (dated Aug. 12, 2014).
Applicant-Initiated Interview Summary for U.S. Appl. No. 11/071,946 (dated May 14, 2014).
Final Office Action for U.S. Appl. No. 11/071,946 (dated Mar. 6, 2014).
"Cisco IOS Quality of Service Solutions Configuration Guide, Release 12.2," Chapter: Policing and Shaping Overview, Cisco http://www.cisco.com/c/en/us/td/docs/ios/12_2/qos/configuration/guide/fqos_c/qcfpolsh.html, pp. 1-15 (Jan. 30, 2014).
Non-Final Office Action for U.S. Appl. No. 11/071,946 (dated Aug. 15, 2013).
Interview Summary for U.S. Appl. No. 11/071,946 (dated Aug. 20, 2010).
Final Office Action for U.S. Appl. No. 11/071,946 (dated Mar. 18, 2010).
Interview Summary for U.S. Appl. No. 11/071,946 (dated Dec. 14, 2009).
Non-Final Office Action for U.S. Appl. No. 11/071,946 (dated Jul. 7, 2009).
Non-Final Office Action for U.S. Appl. No. 11/071,946 (dated Dec. 10, 2008).
Notification of Transmittal of the International Search Report and the Written Opinion of the International Searching Authority, or the Declaration for International Application No. PCT/US06/07838 (dated Feb. 5, 2007).
Pietzuch et al., "Congestion Control in a reliable Scalable Message-Oriented Middleware," University of Cambridge Computer Laboratory, Cambridge, United Kingdom, ACM/IFIP/USENIX Int. Middleware Conference, Springer-Verlag, https://www.doc.ic.ac.uk/~prp/manager/doc/mw2003_cc_gryphon.pdf, pp. 1-20 (2003).
Russell, "Signaling System #7," Third Edition, Chapter 6, pp. 230-232 (Copyright 2000).

\* cited by examiner

METHODS, SYSTEMS, AND COMPUTER READABLE MEDIA FOR PROVIDING GUARANTEED TRAFFIC BANDWIDTH FOR SERVICES AT INTERMEDIATE PROXY NODES

TECHNICAL FIELD

The subject matter described herein relates to providing guaranteed traffic bandwidth for services in communications networks. More particularly, the subject matter described herein relates to providing guaranteed traffic bandwidth for services at an intermediate proxy node, such as a service communications proxy (SCP), security edge protection proxy (SEPP), intermediate gateway, or service mesh node, that routes messages between service endpoints, such as producer and consumer network functions (NFs).

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is a combination of IP address and port number on a network node that hosts a producer NF. Producer NFs register with a network function repository function (NRF). The NRF maintains an NF profile of available NF instances and their supported services. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF.

In addition to the SCP, other examples of intermediate proxy nodes or groups of network nodes that route traffic between producer and consumer NFs include the SEPP, the service gateway, and nodes in the 5G service mesh. The SEPP is the network node used to protect control plane traffic that is exchanged between different 5G PLMNs (Public Land Mobile Networks). As such, the SEPP performs message filtering, policing and topology hiding for all API messages.

The service gateway is a node that sits in front of a group of producer NFs that provide a given service. The service gateway may load balance incoming service requests among the producer NF that provide the service in a manner similar to the SCP.

The service mesh is a name for a group of intermediate proxy nodes that enable communications between producer and consumer NFs. The service mesh may include one or more SCPs, SEPPs, and service gateways.

One problem with the existing 3GPP service architecture is that while message priorities and congestion handling are defined at the 3GPP NFs. But all nodes between consumer and producer NFs cannot register themselves as 5G NFs, e.g., intermediate proxies, service gateways between sites of same vendor etc. Therefore, consumer NFs can see the load of target producer NFs only. There are no guidelines from 3GPP to define behavior on intermediate nodes. Also 3GPP does not define overload handling mechanisms at the intermediate proxy nodes, such as the SCP, SEPP, service gateway or service mesh to avoid service starvation for low priority services. For example, if an SCP is handling traffic between producer and consumer NFs, and the producer NFs are not overwhelmed, the traffic may proceed without invoking congestion control procedures at the SCP. However, the sum of the traffic from the consumer NFs to the producer NFs may overwhelm the SCP. Without a mechanism for handling traffic congestion at the SCP or other intermediate proxy node, such nodes may become congested and drop traffic for low priority services.

Accordingly, there exists a need for methods, systems, and computer readable media for providing guaranteed traffic bandwidth support for services at intermediate proxy nodes.

SUMMARY

A method for providing guaranteed minimum intermediate proxy node bandwidth for services includes configuring, at an intermediate proxy node, a guaranteed minimum bandwidth of the intermediate proxy node reserved to process messages associated with a service. The method further includes receiving a first message at the intermediate proxy node. The method further includes determining, by the intermediate proxy node, that the intermediate proxy node is in an overloaded state. The method further includes identifying, by the intermediate proxy node, the first message as being associated with the service for which the guaranteed minimum bandwidth is configured. The method further includes determining, by the intermediate proxy node, that a portion of the guaranteed minimum bandwidth for the service is available to process the first message. The method further includes routing, by the intermediate proxy node and to a producer network function (NF) that provides the service, the first message and updating a message count for the service.

According to another aspect of the subject matter described herein, configuring the guaranteed minimum bandwidth includes configuring a per-service bandwidth bucket at the intermediate proxy node for reserving and tracking utilization of the guaranteed minimum bandwidth of the intermediate proxy node reserved to process messages associated with the service.

According to yet another aspect of the subject matter described herein, a method for providing guaranteed minimum intermediate proxy node bandwidth for services includes configuring a plurality of different per-service bandwidth buckets at the intermediate proxy node for reserving and tracking utilization of reserved minimum bandwidths of the intermediate proxy node available to be used by messages associated with a plurality of different services.

According to yet another aspect of the subject matter described herein, the intermediate proxy node comprises a service communications proxy (SCP).

According to yet another aspect of the subject matter described herein, the intermediate proxy node comprises a security edge protection proxy (SEPP).

According to yet another aspect of the subject matter described herein, the intermediate proxy node comprises a service mesh node.

According to yet another aspect of the subject matter described herein, identifying the first message as being associated with the service includes determining that a uniform resource indicator (URI) in the first message is associated with the service.

According to yet another aspect of the subject matter described herein, a method for providing guaranteed minimum intermediate proxy node bandwidth for services includes configuring, at the intermediate proxy node, a non-guaranteed traffic bandwidth service (non-GTBS) bucket usable for tracking bandwidth of the intermediate proxy node available to messages that are not associated with a service for which a guaranteed bandwidth of the intermediate proxy node is configured.

According to yet another aspect of the subject matter described herein, a method for providing guaranteed minimum intermediate proxy node bandwidth for services includes receiving a second message at the intermediate proxy node, determining that the second message is not associated with a service for which a guaranteed bandwidth of the intermediate proxy node is configured, determining, using the non-GTBS bucket, that non-GTBS bandwidth is available for the second message, and routing the second message to a producer network function.

According to yet another aspect of the subject matter described herein, a method for providing guaranteed minimum intermediate proxy node bandwidth for services includes receiving a second message at the intermediate proxy node, identifying, by the intermediate proxy node, the second message as being associated with the service for which the guaranteed minimum bandwidth is configured, determining, by the intermediate proxy node, that a portion of the guaranteed minimum bandwidth is not available to process the second message, determining a priority of the second message, detecting the presence of messages associated with the service and of lower priority than the second message that have been accepted for processing at the intermediate proxy node, rejecting one of the messages associated with the service and of lower priority than the second message, and routing, by the intermediate proxy node and to a producer NF that provides the service, the second message and updating a message count for the service.

According to yet another aspect of the subject matter described herein, a system for providing guaranteed minimum intermediate proxy node bandwidth for services includes an intermediate proxy node including at least one processor and a memory. The system further includes a guaranteed traffic bandwidth for services (GTBS) configuration interface implemented by the at least one processor for allowing configuration of a guaranteed minimum bandwidth of the intermediate proxy node reserved to process messages associated with a service. The system further includes a GTBS controller implemented by the at least one processor for receiving a first message, determining that the intermediate proxy node is in an overloaded state, identifying the first message as being associated with the service for which the guaranteed minimum bandwidth is configured, determining that a portion of the guaranteed minimum bandwidth for the service is available to process the first message, routing the first message to a producer network function (NF) that provides the service, and updating a message count for the service.

According to yet another aspect of the subject matter described herein, the GTBS configuration interface provides for configuration of a per-service bandwidth bucket at the intermediate proxy node for reserving and tracking utilization of the guaranteed minimum bandwidth of the intermediate proxy node reserved to process messages associated with the service.

According to yet another aspect of the subject matter described herein, the GTBS configuration interface provides for configuration of aa plurality of different per-service bandwidth buckets at the intermediate proxy node for reserving and tracking utilization of reserved minimum bandwidths of the intermediate proxy node available to be used by messages associated with a plurality of different services.

According to yet another aspect of the subject matter described herein, the intermediate proxy node comprises a service communications proxy (SCP) or a security edge protection proxy (SEPP).

According to yet another aspect of the subject matter described herein, the intermediate proxy node comprises a service mesh node.

According to yet another aspect of the subject matter described herein, the GTBS controller is configured to identify the first message as being associated with the service using a uniform resource indicator (URI) in the first message.

According to yet another aspect of the subject matter described herein, the intermediate proxy node includes a non-GTBS bucket usable for tracking bandwidth of the intermediate proxy node available to messages that are not associated with a service for which a guaranteed bandwidth of the intermediate proxy node is configured.

According to yet another aspect of the subject matter described herein, the GTBS controller is configured to receive a second message, determine that the second message is not associated with a service for which a guaranteed bandwidth of the intermediate proxy node is configured, determine, using the non-GTBS bucket, that non-GTBS bandwidth is available for the second message, and route the second message to a producer network function.

According to yet another aspect of the subject matter described herein, GTBS controller is configured to receive a second message, identify the second message as being associated with the service for which the guaranteed minimum bandwidth is configured, determine that a portion of the guaranteed minimum bandwidth is not available to process the second message, determine a priority of the second message, detect the presence of messages associated with the service and of lower priority than the second message that have been accepted for processing at the intermediate proxy node, reject one of the messages associated with the service and of lower priority than the second message, and route, by the intermediate proxy node and to a producer NF that provides the service, the second message and update a message count for the service.

According to yet another aspect of the subject matter described herein, a non-transitory computer readable medium having stored thereon executable instructions that when executed by a processor of a computer control the computer to perform steps is provided. The steps include configuring, at an intermediate proxy node, a guaranteed minimum bandwidth of the intermediate proxy node reserved to process messages associated with a service. The steps further include receiving a first message at the intermediate proxy node. The steps further include determining, by the intermediate proxy node, that the intermediate proxy node is in an overloaded state. The steps further include identifying, by the intermediate proxy node, the first message as being associated with the service for which the guaranteed minimum bandwidth is configured. The steps further include determining, by the intermediate proxy node, that a portion of the guaranteed minimum bandwidth for the service is available to process the first message. The steps further include routing, by the intermediate proxy node and to a producer network function (NF) that provides the service, the first message and updating a message count for the service.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
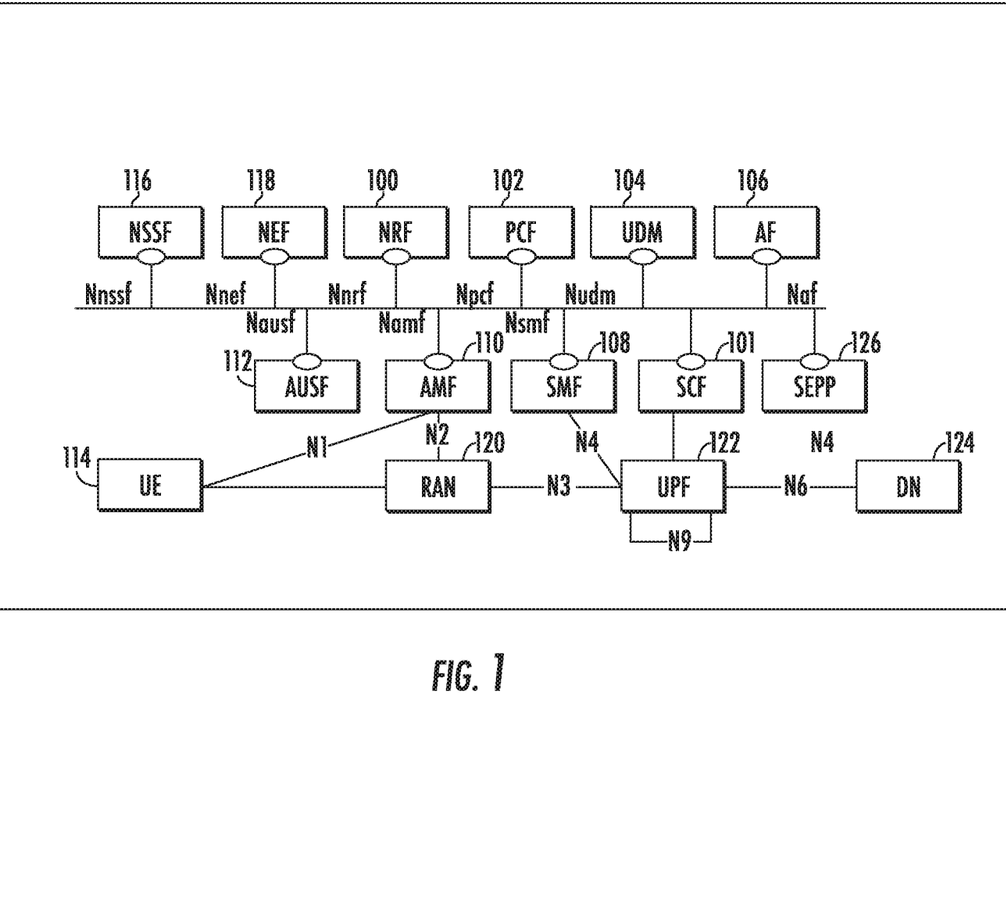
FIG. 1 is a network diagram illustrating an exemplary 5G network architecture.

The subject matter described herein relates to methods, systems, and computer readable media for providing guaranteed traffic bandwidth for services at an intermediate proxy node between consumer and producer NFs. FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. In addition, SCP 101 may perform load balancing of connections between consumer and producer NFs.

NRF 100 is a repository for NF profiles. In order to communicate with a producer NF, a consumer NF or an SCP must obtain the NF profile from NRF 100. The NF profile is a JavaScript object notation (JSON) data structure defined in 3GPP TS 29.510. The NF profile definition includes at least one of a fully qualified domain name (FQDN), an Internet protocol (IP) version 4 (IPv4) address or an IP version 6 (IPv6) address.

In FIG. 1, any of the nodes (other than SCP 101 and NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as UE 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. As indicated above, the SEPP is an example of an intermediate proxy node that may become overwhelmed if appropriate congestion control and/or bandwidth reservation procedures are not implemented at the intermediate proxy node.

Guaranteed Traffic Bandwidth for Services (GTBS)

In the 5G deployment architecture, 3GPP releases 15 and 16 recommend proxy nodes, such as the SCP or SEPP, that sit between client/consumer NFs and server/producer NFs. Proxy nodes, such as the SCP, provide transport and routing functionality between N consumer NFs and M producer NFs, where N and M are integers. Similarly, a network operator may deploy its own service mesh/intermediate gateway/controller nodes between 5G NFs. Service mesh/ intermediate gateway/proxy nodes help to perform most common activities among various services, e.g., monitoring, overload control, traffic management, service discovery, etc. In 5G, each producer NF can publish its load level to the NRF. Consumer NFs can subscribe for such changes and be reactive to adjust their traffic rates.

One problem with the existing 3GPP network architecture is that not all nodes between consumer and producer NFs can register themselves as a 5G NF. These nodes that cannot register include intermediate proxies, service gateways between sites of the same vendor, etc. Because intermediate proxy nodes cannot register with the NRF as a 5G NF, consumer nodes may not be aware of the load on the intermediate proxy nodes and may overwhelm the intermediate proxy nodes. Similarly, the NRF provides notifications to service consumers that allows consumers to see the load of target producer nodes. However, because intermediate proxy nodes cannot register as service producers, there are no guidelines from 3GPP to define behavior on an intermediate proxy node for responding to or issuance of such notifications.

Even if an operator plans the capacity of its intermediate proxy nodes, a signaling storm from rogue services/NFs, can overload intermediate network/node/route.

Thus, with the service mesh (or intermediate proxy, such as the SCP/SEPP), there is need to set up policies that ensure guaranteed traffic bandwidth for a given NF service messaging. The subject matter described herein includes enhancements in service mesh/SCP/SEPP/intermediate gateways, etc., for guaranteed severability of multiple services during congestion/overload conditions of intermediate proxy nodes.

Regardless of a shared or dedicated network, intermediate proxy nodes need a way to ensure guaranteed serviceability for all or selected services. Without GTBS, messaging between two services can over-run the capacity of service mesh/intermediate proxy nodes and thus may impact functioning of the intermediate proxy nodes, as well as other services.

Figure 2:
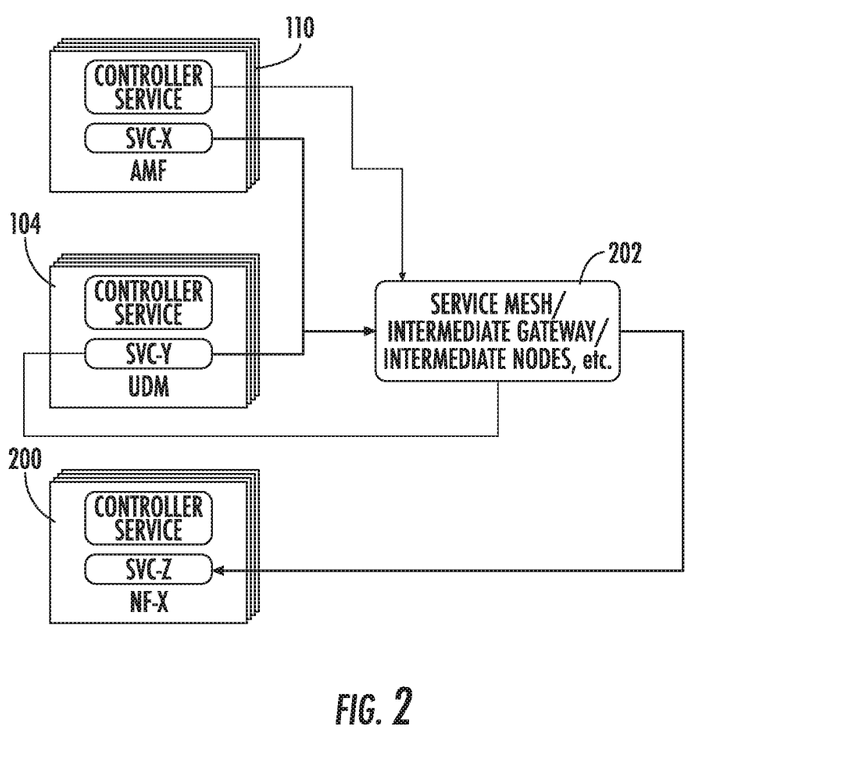
FIG. 2 is a diagram illustrating 5G network functions connected via intermediate proxy nodes, such as a service mesh.

FIG. 2 illustrates how traffic between N nodes can overwhelm a service mesh. In FIG. 2, an AMF 110 is connected to a UDM 104 and another NF 200 via a service mesh 202. AMF 200 provides service Svc-X. UDM 104 provides service Svc-Y. NF 200 provides service Svc-Z. Messaging between Svc-X and Svc-Y may exhaust the capacity of intermediate proxy node 202 (during a data storm or other such scenario). As a result, Svc-X->Svc-Z and Svc-Y->Svc-Z servicing may be adversely impacted.

5G does not provide guidance on message priority to be used for a message within a given service. As per 3GPP TS 29.500, all messages without priority defined by clients, shall have default priority of 24. Also, it is extremely difficult for vendors/operators to drive/assign a priority for each service message, which can fairly justify the priority compared to other services of other NFs.

At the same time, to ensure stability of intermediate proxy nodes during data storm/overload conditions, operators set up a throttling policy to reject low priority messages, when system capacity is beyond a certain point.

The following are examples of policies that may be implemented at an intermediate proxy node when system capacity is beyond a certain point.
  I. When utilization of system compute resources crosses 60%, reject all messages with priority >=15
  II. When utilization of system computing resources crosses 80%, reject all messages with priority >=7

While such policies may be useful, they fail to take into account what happens to the service with low priority messages/traffic during congestion events.

Another problem that occurs when all lower priority messages are rejected in a congestion situation is that if all messages of a given service are of lower priority, then priority-based thresholds may starve a given service. For example, in FIG. 2, if all messages of the service Svc-Z have the default priority and the intermediate proxy node goes into overload, all messages for service Svc-Z will be rejected, preventing service Svc-Z from being provided in the network.

In 5G deployments, there is the possibility of many-to-many mapping between NFs (network functions) and services, i.e., a given NF may provide multiple services, and a service may be provided by multiple NF instances.

Figure 3:
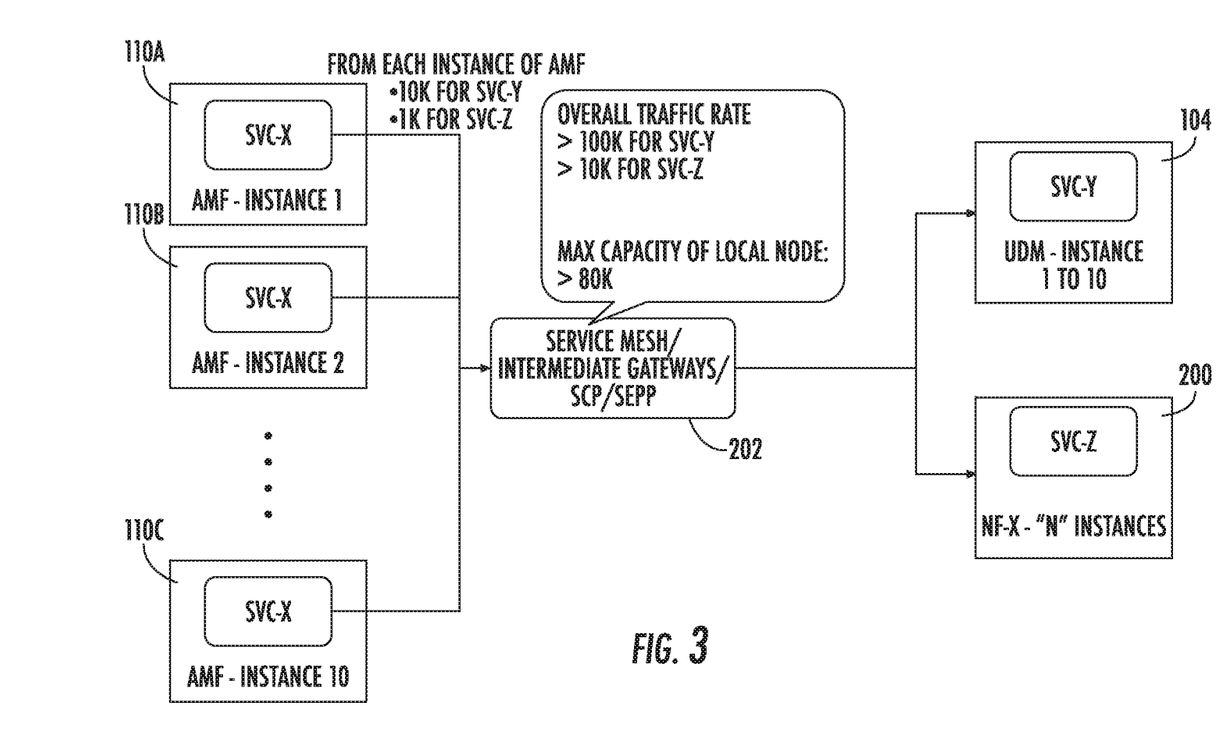
FIG. 3 is a network diagram illustrating potential congestion that can occur at an intermediate proxy node between 5G network functions.

FIG. 3 is a network diagram illustrating an example where multiple producer NFs provide services to multiple consumer NFs. In the illustrated example, the consumer NFs or AMFs 110a through 110c. The producer NFs are UDM 104 and NF instance 200. The producer and consumer NFs are connected via intermediate proxy node 202. In one example, it can be assumed that there are 10 AMF instances and 10 UDM instances running. Each UDM instance may be capable of handling 10 kilobits per second of traffic. However, the multiple AMF instances running service Svc-X may flood intermediate proxy node 202 with messaging towards service Svc-Y provided or hosted by each instance of UDM 104. In addition, intermediate proxy node 202 may need a policy to ensure that messaging for service Svc-Z can be provided by rejecting messages relating to Svc-X and Svc-Y. The messages for service Svc-Z may have any priority, but there should not be a complete denial of service for service Svc-Z, even though service Svc-Z messages have lower priority than the messaging relating to other services.

In a 5G deployment, HTTP connections are on-demand. Thus, it is possible that Svc-X of AMF-instance 1 can instantiate multiple connections with the intermediate proxy node, to distribute the traffic on multiple connections. For example, there may be 10 connections between SVC-X of AMF-instance 1 and SCP/SEPP node. Thus, overall traffic originated by a given Svc-X instance (10K for Svc-Y and 1K for Svc-Z), will spread across 10 connections, i.e., each connection handles 1.1K only.

Thus, performing ingress control based on a source service or per connection basis is not a viable option for a network that implements a service mesh since there are multiple and even on-demand connections for ingress traffic of a service.

Similarly, the intermediate proxy node may have 10 connections with each instance of a UDM and may be connected to 10 different instances of a UDM. Thus, performing egress control based on a target node or per connection basis, is not a viable option for a service mesh or intermediate NFs.

The subject matter described herein includes a service mesh node, SCP, SEPP, or other intermediate proxy node between a consumer NF and a producer NF that supports a mechanism so that guaranteed traffic bandwidth can be allocated for a particular service. This mechanism is referred to herein as Guaranteed Traffic Bandwidth for Services (GTBS).

Table 1 shown below illustrates an example of guaranteed traffic bandwidth service rates for different services that may be implemented by an intermediate proxy node.

TABLE 1

GTBS Rates for Different Services

|  | Svc-X | Svc-Y | Svc-z |
|---|---|---|---|
| GTBS rate (Configurable reserved capacity) | 5% | 10% | 3% |

In Table 1, each of services Svc-X, Svc-Y, and Svc-Z has a guaranteed bandwidth service rate which is a percentage of reserved capacity of the intermediate proxy node. For each service, the percentage of the reserved capacity of the intermediate proxy node that will be used exclusively by messages of a given service when the intermediate proxy node is in an overload state, even if the messages of a given service are of lower priority than messages of other services that are rejected by the intermediate proxy node. For example, if a message for service Svc-X is with a priority of 10 is received at an intermediate proxy node, the message for service Svc-X may be routed under the guaranteed bandwidth of service Svc-X and another message with a higher priority (higher priority means lower numeric priority value according to 3GPP) is rejected by the intermediate proxy node. In Table 1, service Svc-X is guaranteed 5% of the reserved capacity of the intermediate proxy node, service Svc-Y is guaranteed 10% of the reserved capacity of the intermediate proxy node, and service Svc-Z is guaranteed 3% of the reserved capacity of the intermediate proxy node. In this model, the network operator configures the following:
1. Overall capacity of intermediate proxy node.
   E.g. overall capacity of node/service mesh/SCP etc. is 100K.
2. GTB for each supported service through the intermediate proxy node.
   E.g. If overall capacity of the intermediate proxy node is 100K, then guaranteed bandwidth or GTB (based on Table 1) will be as follows:
   Svc-X: 5K
   Svc-Y: 10K
   Svc-Z: 3K Thus, regardless of message priority of message across multiple service messages (passing through the intermediate proxy node), each service (with configured GTBS) will have ensured/guaranteed allocated capacity on intermediate proxy nodes.

Functional Details:

The following are functional details that may be implemented by an intermediate proxy node, such as an SCP, SEPP, service mesh, or other intermediate proxy node that provides guaranteed traffic bandwidth for services.
1. Check overload state of the intermediate proxy node. If the intermediate proxy node is not in an overload condition, then no further check is required. Messages should be allowed to pass through the intermediate proxy node as part of non-GTBS bandwidth. This is the case to handle normal functioning of the intermediate proxy node (during non-overload scenarios)
2. If the intermediate proxy node is in an overload condition, check if the target service of a received message has GTBS configured.
   a. If GTBS is configured and there is still bandwidth available, then allow messages to pass through the intermediate proxy node (regardless of message priority).
      Only messages being processed under a non-GTBS bandwidth bucket, will be throttled based on priority.
   b. If GTBS is configured and there is no bandwidth available (for non-GTBS traffic), then do the following:
      i. If there are lower priority (i.e., lower than the priority of the current message) messages in the GTBS bucket, then allow that message from GTBS bandwidth.
         The GTBS bucket provides for fine-grained logic to allow higher priority messages among other messages for that service.
         E.g. for a given service, P5 might be the highest priority message among all messages for that service. Thus, during overload, P5 messages for such service must be allowed (up to the configured bandwidth for the service), even when the overload policy might be rejecting P3 messages of other services.
      ii. If there are no lower or same priority messages in the GTBS bucket, then the message treatment procedure is same as for services with no GTBS configured. (see details in step c)
   c. If GTBS is not configured, then run the message through the non-GTBS bucket. Thus, a message will be allowed/rejected based on the overload policy of the system (Overload policy accepts/rejects messages based on message priority and system overload level).
      i. If the overload policy allows message to pass through, then the message will be processed.
      ii. Otherwise, the message will be rejected.

With this approach, services with configured GTBS will have guaranteed severability through service mesh/intermediate proxy nodes. This holds true even during data storms or other anomalies in the network.

Each service can be categorized and identified using PATH/URI specified by 3GPP in corresponding Network Function specifications. This approach can also be applied to non-5G messages based on PATH/URI. Thus, a network operator should be able to configure GTB for any service based on path/URI elements. This approach can also be applied to provide GTB to a given producer as well (based on FQDN). This helps in use-cases of managing emergency services and other premium customers. For messages with no priority assigned, application recommends operator should specify default message priority. (As per 3GPP TS 29.500, all 5G core (5GC) messages without priority defined by clients, shall have default priority of 24).

An intermediate proxy node that implements GTBS may also implement the following types of tracking/monitoring to enforce GTBS:

For services with configured GTBS, track the message rate of a given priority processed under GTBS;

Track overall message rate and compare to overall traffic capacity of the intermediate proxy node; and Track non-GTBS message rate for individual priority messages.

Table 2 shown below illustrates an example of message rates that may be tracked at an intermediate proxy node that implements guaranteed traffic bandwidth for services.

TABLE 2

Message Rates Tracked by Intermediate Proxy Nodes

| Service | Guaranteed GTB quota | GTBS Traffic rate | GTBS Traffic rate per priority Message Priority | rate |
|---|---|---|---|---|
| Svc-X | 5K | 2K | P0 | 1K |
|  |  |  | P5 | 1K |
| Svc-Y | 10K | 10K | P0 | 7K |
|  |  |  | P1 | 2K |
|  |  |  | P5 | 1K |
| Svc-Z | 3K | 1K | P0 | 1K |

In Table 2, it can be seen that the traffic rate for each of services Svc-X, Svc-Y, and Svc-Z is tracked. In addition, rates for each configured message priority within a given service are also tracked. For example, for service Svc-X, message rates for priority P0 and P5 are tracked. It should be noted that services that are not defined as having guaranteed bandwidth will not have a configured guaranteed bandwidth service rate.

As stated above, in addition to tracking message rates of messages with guaranteed bandwidth service, an intermediate proxy node may also track message rates based on priority for non-GTBS traffic. Table 3 shown below illustrates example non-GTBS traffic that may be tracked by an intermediate proxy node.

TABLE 3

Tracked message rates based on priority for non-GTBS traffic
Non-GTBS traffic based on Priority

| Priority | Rate |
|---|---|
| P0 | 5K |
| P1 | 5K |
| P3 | 10K |
| P6 | 15K |
| P15 | 11K |
| P18 | 24K |

In Table 3, message rates for non-GTBS traffic are tracked per defined message priority.

Another metric that may be tracked by an intermediate proxy node that implements GTBS service is the total message rate of non-GTBS and GTBS traffic. Table 4 shown below illustrates the total message rate that may be tracked by such an intermediate proxy node.

TABLE 4

Total Traffic Rate of Non-GTBS and GTBS Traffic
Current Traffic rate (GTBS + non-GTBS)

| 83K |
|---|

Table 4 illustrates the sum of all the traffic rates in Table 1 and Table 2, which is the total rate of traffic that is currently being handled by the intermediate proxy node. Such a rate may be compared to the overall message capacity of the node to determine whether the node is in an overloaded state. For example, the network operator may configure the overload triggering state of the node to be 80% of total capacity. If the node is capable of handling 100 k messages per second and the engineered overload threshold is defined at 80 k, then the rate of 83 k in Table 4 would indicate that the node is in an overloaded state and trigger GTBS service as described herein.

For a simplified explanation of the GTBS algorithm, the following examples in Table 5 assume that overload policy rejects messages at 100% nodal capacity. However, the rejection of messages from the non-GTBS bucket can be applied using an overload policy with multiple throttle levels and message priority mappings (where messages up to a certain priority level will be rejected at a certain system overload level).

TABLE 5

Scenario and Message Handling in Overload State

| Case # (Each scenario is based on Tables 1-4) | Node behavior | Action |
|---|---|---|
| 1. Message with priority 4 is received for Svc-A | There is no guaranteed quota for Svc-A. Since low priority messages are in process for the non-GTBS bucket, thus allow the message for processing. | Capture/update non-GTBS traffic rate for P4. If required, lower/same priority messages will be rejected from non-GTBS. |
| 2. Message with priority 18 is received for Svc-A | There is no guaranteed quota for Svc-A. Also, no lower priority messages are in process for the non-GTBS bucket, thus the message for Svc-A will be processed if the system's overload policy allows the message. Overall traffic rate is less than 100%, allow the message for processing. | Capture/update non-GTBS traffic rate for P4. If required, Low/same priority messages will be rejected from non-GTBS. |
| 3. Assume system is running at 100% capacity. Message with priority 18 is received for Svc-A | There is no guaranteed quota for Svc-A. The message for the non-GTBS bucket will be processed, if the system's overload policy allows the message No lower priority messages are in process for the non-GTBS bucket, thus, the message for Svc-A will be processed if the system has any computing resources available. If no buffer space exists to store the message, reject the message | Message rejected |
| 4. Message with priority 20 is received for Svc-X | Svc-X has quota available in its guaranteed rate bucket for Svc-X. Allow the message to Svc-X | Capture/update Svc-X GTBS traffic rate for P20. |
| 5. Assume system is running at 100% capacity. Message with priority 20 is received for Svc-X | Svc-X has quota available in its guaranteed rate. Allow the message to Svc-X | Capture/update Svc-X GTBS traffic rate for P20. The system will reject messages in the non-GTBS bucket. From there, even the highest priority message can be rejected to ensure system nodal capacity is not exceeded. |
| 6. Message with priority 4 is | Svc-Y guaranteed capacity is exhausted. | Capture/update Svc-Y GTBS traffic |

TABLE 5-continued

Scenario and Message Handling in Overload State

| # | Case (Each scenario is based on Tables 1-4) | Node behavior | Action |
|---|---|---|---|
| | received for Svc-Y | However, there are lower priority (lower than 4) messages being processed in the GTBS bucket. Message is allowed from the GTBS bucket. | rate for P4. (Lower/same priority messages of Svc-Y will be processed under non-GTBS. If required, those messages will be rejected.) |
| 7. | Message with priority 6 is received for Svc-Y | Svc-Y guaranteed capacity is exhausted. Also there are no lower priority messages in the GTBS bucket of Svc-Y. Thus, the message will be processed from non-GTBS bucket. The message for the non-GTBS bucket will be processed if system's overload policy allows the message. If overall traffic rate is less than 100% capacity, message will be allowed for processing. | Capture/update non-GTBS traffic rate for P6. Lower/same priority messages of Svc-Y will be processed under non-GTBS, when the GTBS bucket is exhausted. |
| 8. | Assume system is running at 100% capacity. Message with priority 6 is received for Svc-Y | Svc-Y guaranteed capacity is exhausted. Also there are no lower priority messages in the GTBS bucket of Svc-Y. Thus, the message will be processed from the non-GTBS bucket. The message for the non-GTBS bucket will be processed if system's overload policy allows the message. However, lower priority messages are in process for the non-GTBS bucket, thus allow the message for processing. | Capture/update non-GTBS traffic rate for P6. (Low/same priority messages will be rejected first.) |
| 9. | Assume system is running at 100% capacity. Message with priority 18 is received for Svc-Y | Svc-Y guaranteed capacity is exhausted. Also there are no lower priority messages in the GTBS bucket of Svc-Y. Thus, the message will be processed from non-GTBS bucket. The message for the non-GTBS bucket will be processed if system's overload policy allows the message No lower priority messages are in process for the non-GTBS bucket, thus the message for Svc-Y will be processed if the system has any computing resources available. No more buffer space available to process the message, reject the message. | Message rejected Lower/same priority messages will be rejected first. |

In scenario 1 in Table 5, a message is received from service A for which there is no guaranteed bandwidth service configured. Accordingly, the message will be processed according to the policies defined for the non-GTBS bucket. The message has a priority of 4. In this example, it is assumed that there are messages in the non-GTBS bucket with priority lower than 4 and that there is bandwidth available. Accordingly, the message will be passed and the count for the non-GTBS traffic for priority P4 will be updated.

In scenario 2 in Table 5, another message for Svc-A is received. As with example 1, there is no guaranteed bandwidth service configured for the message, so the message will be processed according to the policies defined for the non-GTBS bucket. In scenario 2, the message has a priority of 18. It is assumed that there are no messages in the non-GTBS bucket with priority lower than 18. Accordingly, the message will be routed if there is bandwidth available for the non-GTBS messages of priority 18. If such bandwidth is not available, the message will be rejected.

In scenario 3, a message with priority 18 for Svc-A is received. However, it is assumed that the system is running at 100% capacity. Since there is no guaranteed bandwidth service configured for Svc-A, no lower priority messages in process in the non-GTBS bucket, and no system capacity available, the message will be rejected.

In scenario 4 in Table 5, a message with priority 20 is received for Svc-X. Guaranteed bandwidth service is configured for Svc-X. It is also assumed that there is quota available within the guaranteed rate for Svc-X. Accordingly, the message will be passed and the rate for priority 20 traffic of Svc-X will be updated.

In scenario 5 in Table 5, a message with priority 20 for Svc-X is received. In this example, it is assumed that the system is running at 100% capacity but there is quota available within the guaranteed rate for messages of Svc-X. Accordingly, the messages will be routed, and the quota will be updated for priority 20 and Svc-X. It should be noted that the system will reject messages in the non-GTBS bucket when the system is running at 100% capacity even if the messages have higher priority than messages that are allowed within the reserved quota for a given service.

In scenario 6 in Table 5, a message with priority 4 is received for Svc-Y. It is also assumed that the Svc-Y guaranteed capacity is exhausted. However, there are messages with lower priority than 4 in the GTBS bucket of Svc-Y. Accordingly, the message will be allowed from the GTBS bucket for Svc-Y and the GTBS traffic rate for priority P4 will be updated for Svc-Y.

In scenario 7 in Table 5, a message with priority 6 is received for Svc-Y. It is also assumed that the Svc-Y guaranteed capacity is exhausted and there are no lower priority messages in the GTBS bucket for Svc-Y. Accordingly, the message will be processed from the non-GTBS bucket. The message with either be routed or rejected based on the policy defined for the non-GTBS bucket.

In scenario 8, it is assumed that the system is running at 100% capacity and a message with priority 6 is received for Svc-Y. It is also assumed that the Svc-Y guaranteed capacity is exhausted, and there are no lower priority messages in the GTBS bucket for Svc-Y. Thus, the message will be processed from the non-GTBS bucket. The message will be allowed or rejected based on its priority and the policies configured for the non-GTBS bucket.

In scenario 9, it is assumed that the message is running at 100% capacity. A message with priority 18 is received for Svc-Y. It is also assumed that Svc-Y guaranteed capacity is exhausted, and there are no lower priority messages in the GTBS bucket for Svc-Y. Thus, the message will be processed from the non-GTBS bucket. In this example, it is assumed that there are no lower priority messages in the non-GTBS bucket since the system is running at 100% capacity and there is no more buffer space to process the message, the message will be rejected.

Figure 4:
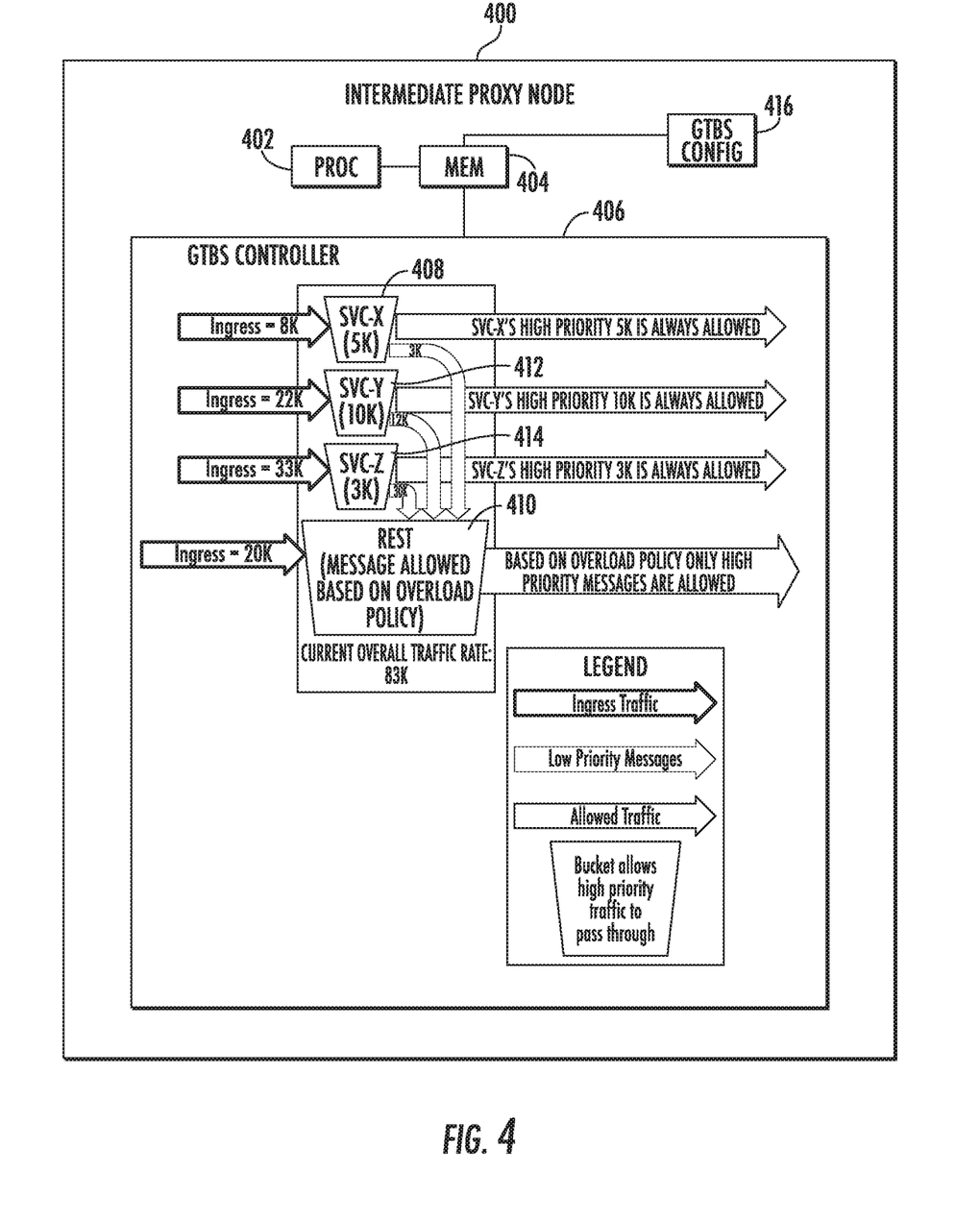
FIG. 4 is a block diagram illustrating an intermediate proxy node with a per service congestion controller for implementing service-based bandwidth guarantees between consumer and producer network functions.

FIG. 4 is a block diagram of an intermediate proxy node that implements guaranteed traffic bandwidth for services as described herein. Referring to FIG. 4, intermediate proxy node 400 may be an SCP, an SEPP, a service mesh node, a service proxy, or other node that routes messages between service consumers and service producers. In the illustrated example, intermediate proxy node 400 includes at least one processor 402 and memory 404. Intermediate proxy node 400 further includes a guaranteed traffic bandwidth for services (GTBS) controller 406 that determines whether the intermediate proxy node is in an overloaded state and implements a GTBS service with configured per-service guaranteed minimum bandwidths of the intermediate proxy node as described above. In the illustrated example, the per service guaranteed minimum bandwidths are reserved and tracked using per-service buckets. For example, bucket 408 for service Svc-X is configured to allow 5 k (5000) messages for service Svc-X when intermediate proxy node 400 is in an overloaded state. In the illustrated example, the ingress rate for service Svc-X is 8 k. Accordingly, 5 k of the higher priority messages for service Svc-X are allowed, while the remaining 3 k of messages for service Svc-X are passed into non-guaranteed bucket 410, where the messages are allowed or rejected based on the overload control policy for non-guaranteed bandwidth traffic.

Intermediate proxy node 400 implements bucket 412 for traffic for service Svc-Y. Bucket 412 is configured to reserve and track utilization of a guaranteed minimum bandwidth of 10 k messages for service Svc-Y. In the illustrated example, the ingress message rate for service Svc-Y is 22 k. Accordingly, 10 k of the messages for service Svc-Y will be allowed while 12 k of the messages for service Svc-Y will be passed into non-guaranteed bucket 410, where messages will be allowed or rejected based on the overload control policy of intermediate proxy node 400 for non-guaranteed bandwidth traffic.

Intermediate proxy node 400 implements a bucket 414 for messages for service Svc-Z with a guaranteed minimum bandwidth of 3 k. In the illustrated example, the ingress message rate for service Svc-Z is 33 k. Accordingly, 3 k of the traffic will be passed while 30 k of the message traffic for service Svc-Z will be passed to non-guaranteed bucket 410 where the messages will be passed or rejected based on the overload control policy for non-guaranteed traffic.

Intermediate proxy node 400 includes a GTBS configuration interface 416 that allows the network operator to configure guaranteed minimum bandwidths for services. GTBS configuration interface 416 may allow the user to define service identifying parameters for each service, and per-service guaranteed minimum bandwidths for a plurality of different services. The guaranteed minimum bandwidths may be reserved and tracked using per-service GTBS buckets, such as buckets 408 and 412. Non-guaranteed bucket 410 may be configured by default to track the non-reserved (system) bandwidth of intermediate proxy node 400.

Figure 5:
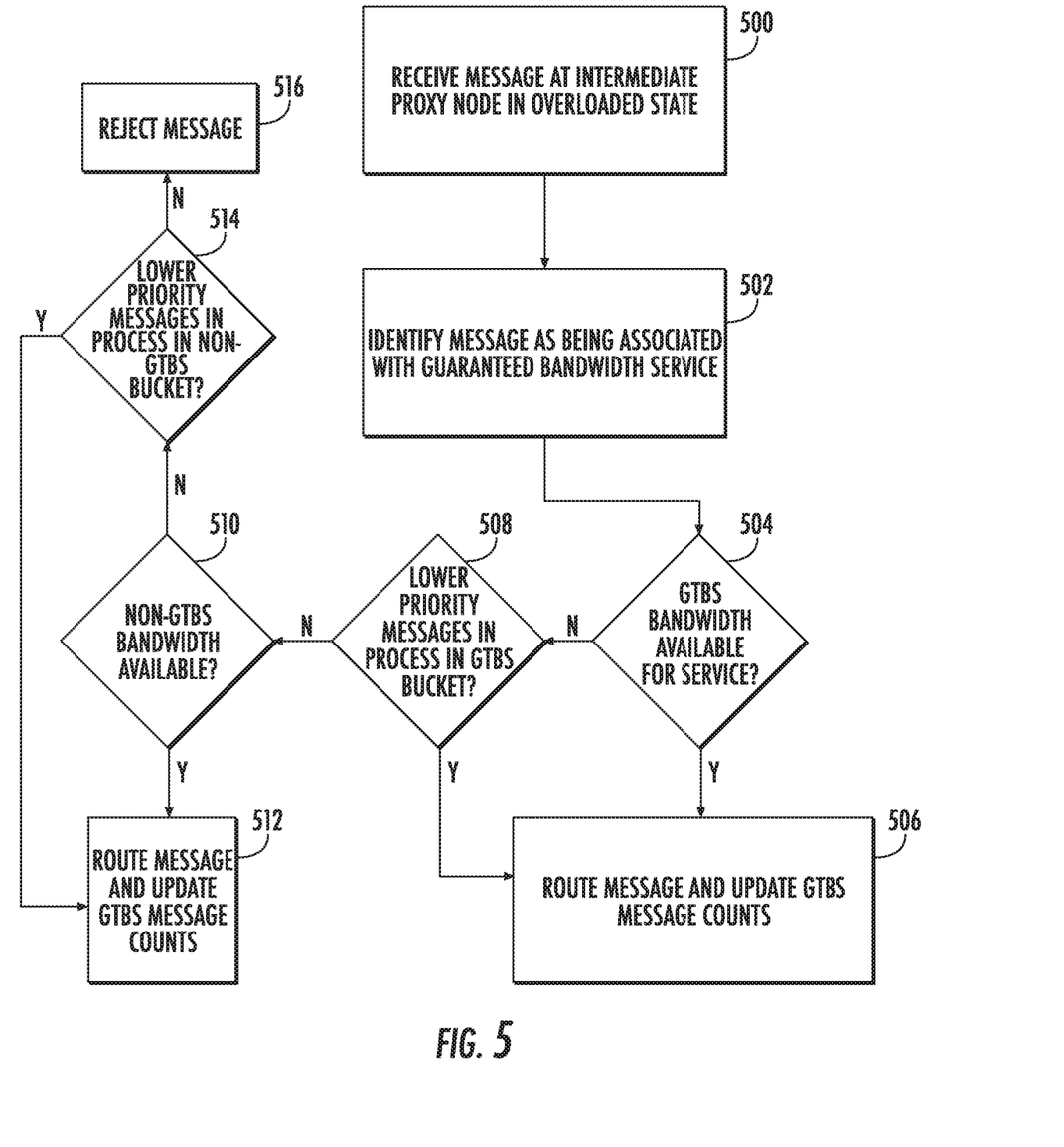
FIG. 5 is a flow chart illustrating an exemplary process for providing guaranteed traffic bandwidth for services at an intermediate proxy node between consumer and producer NFs.

FIG. 5 is a flow chart illustrating an exemplary process for implementing guaranteed traffic bandwidth for services at an intermediate proxy node. Referring to FIG. 5, in step 500, a message is received at an intermediate proxy node that is in an overloaded state. For example, a message may be received at an SCP, an SEPP, a service mesh node or other intermediate proxy node. "Overloaded state" means that the utilization of the intermediate proxy node has crossed an operator-defined threshold, such as 80% of the available capacity for processing messages.

In step 502, the message is identified as being associated with a guaranteed bandwidth service. For example, GTBS controller 406 may identify the message as being associated with guaranteed bandwidth service based on one or more parameters in the message. Examples of such parameters include the URI or other service identifying parameters.

In step 504, it is determined whether there is guaranteed bandwidth available for the service. For example, if the guaranteed bandwidth for the service is 5 k messages for the current measurement interval and only 3 k messages have been transmitted, then 2 k of available bandwidth remains. If the guaranteed bandwidth is available, control proceeds to step 506 where the message is passed or routed, and message counts are updated. For example, GTBS controller 406 may pass messages below the configured guaranteed bandwidth for each service and update message counts per service, per priority within a service, and overall message count.

In step 504, if it is determined that the guaranteed bandwidth for the service is not available, control proceeds to step 508 where it is determined whether lower priority messages exist in the GTBS bucket. For example, suppose the message is for service A and carries a priority value of 4. GTBS controller 406 will analyze messages in the GTBS bucket for service A that are waiting to be transmitted. If there is at least one message with priority 5 or higher, GTBS controller 406 may replace the lower priority message with the message for service A. Control then proceeds to step 506 where the message for service A is transmitted and the message counts are updated.

In step 508, if it is determined that there are no lower priority messages in the GTBS bucket, control proceeds to step 510 where it is determined whether non-GTBS bandwidth is available. For example, GTBS controller 406 may determine whether non-GTBS bandwidth is available by determining whether the non-GTBS bucket has any remaining message processing capacity. Because the non-GTBS bucket does not have any reserved capacity, the determination as to whether the non-GTBS bucket has any available capacity may be determined based on whether there is any system capacity available to process the message. Even though the system is in an overloaded state, there may be some remaining capacity above the overload threshold. If GTBS controller 406 determines that there is non-GTBS capacity available, control proceeds to step 512 where the message is routed.

In step 510, if it is determined that non-GTBS capacity not available, control proceeds to step 514 where it is determined whether lower priority messages exist in the non-GTBS bucket. For example, suppose the message carries a priority value of 4. GTBS controller 406 will analyze messages in the non-GTBS bucket that are waiting to be transmitted. If there is at least one message with priority 5 or higher, GTBS controller 406 may replace the lower priority message with the message having priority 4. Control then proceeds to step 512 where the message with priority 4 is transmitted, and the message counts are updated. In step 514, if there are no lower priority messages in the non-GTBS bucket, control proceeds to step 516 where the message is rejected.

The subject matter described herein allows operators to use 5G routes to fine tune and guaranteed serviceability between 5G NF services. Without such guaranteed serviceability support, data storm/rogue services/functions may overload the intermediate proxy nodes and could lead to service failures. Since the solution can be applied to any non-5G services as well, thus implementing this recommendation on intermediate gateway/proxy, can ensure minimal viable serviceability between any services.

The disclosure of each of the following references is hereby incorporated herein by reference in its entirety.

REFERENCES

3GPP TS 29.500, Technical Specification Group Core Network and Terminals; 5G System; Technical Realization of Service Based Architecture; Stage 3 (Release 16) V16.0.0, (2019-06).

3GPP TS 29.510, Technical Specification Group Core Network and Terminals; 5G System; Network Function Repository Services; Stage 3 (Release 16) V16.0.0 (2019-06).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing guaranteed minimum intermediate proxy node traffic bandwidth for services, the method comprising:
   configuring, at an intermediate proxy node, a guaranteed minimum bandwidth of the intermediate proxy node reserved to process messages associated with a service;
   receiving a first message at the intermediate proxy node;
   determining, by the intermediate proxy node, that the intermediate proxy node is in an overloaded state;
   identifying, by the intermediate proxy node, the first message as being associated with the service for which the guaranteed minimum bandwidth is configured;
   determining, by the intermediate proxy node, that a portion of the guaranteed minimum bandwidth for the service is available to process the first message; and
   routing, by the intermediate proxy node and to a producer network function (NF) that provides the service, the first message and updating a message count for the service.

2. The method of claim 1 wherein configuring the guaranteed minimum bandwidth includes configuring a per-service bandwidth bucket at the intermediate proxy node for reserving and tracking utilization of the guaranteed minimum bandwidth of the intermediate proxy node reserved to process messages associated with the service.

3. The method of claim 1 comprising configuring a plurality of different per-service bandwidth buckets at the intermediate proxy node for reserving and tracking utilization of reserved minimum bandwidths of the intermediate proxy node available to be used by messages associated with a plurality of different services.

4. The method of claim 1 wherein the intermediate proxy node comprises a service communications proxy (SCP).

5. The method of claim 1 wherein the intermediate proxy node comprises a security edge protection proxy (SEPP).

6. The method of claim 1 wherein the intermediate proxy node comprises a service mesh node.

7. The method of claim 1 wherein identifying the first message as being associated with the service includes determining that a uniform resource indicator (URI) in the first message is associated with the service.

8. The method of claim 1 comprising configuring, at the intermediate proxy node, a non-guaranteed traffic bandwidth service (non-GTBS) bucket usable for tracking bandwidth of the intermediate proxy node available to messages that are not associated with a service for which a guaranteed bandwidth of the intermediate proxy node is configured.

9. The method of claim 8 comprising:
   receiving a second message at the intermediate proxy node;
   determining that the second message is not associated with a service for which a guaranteed bandwidth of the intermediate proxy node is configured;
   determining, using the non-GTBS bucket, that non-GTBS bandwidth is available for the second message; and
   routing the second message to a producer network function.

10. The method of claim 1 comprising:
    receiving a second message at the intermediate proxy node;
    identifying, by the intermediate proxy node, the second message as being associated with the service for which the guaranteed minimum bandwidth is configured;
    determining, by the intermediate proxy node, that a portion of the guaranteed minimum bandwidth is not available to process the second message;
    determining a priority of the second message;
    detecting the presence of messages associated with the service and of lower priority than the second message that have been accepted for processing at the intermediate proxy node;
    rejecting one of the messages associated with the service and of lower priority than the second message; and
    routing, by the intermediate proxy node and to a producer network function NF that provides the service, the second message and updating a message count for the service.

11. A system for providing guaranteed minimum intermediate proxy node bandwidth for services, the system comprising:
    an intermediate proxy node including at least one processor and a memory;
    a guaranteed traffic bandwidth for services (GTBS) configuration interface implemented by the at least one processor for allowing configuration of a guaranteed minimum bandwidth of the intermediate proxy node reserved to process messages associated with a service; and
    a GTBS controller implemented by the at least one processor for receiving a first message, determining that the intermediate proxy node is in an overloaded state, identifying the first message as being associated with the service for which the guaranteed minimum bandwidth is configured, determining that a portion of the guaranteed minimum bandwidth for the service is available to process the first message, routing the first message to a producer network function (NF) that provides the service, and updating a message count for the service.

12. The system of claim 11 wherein the GTBS configuration interface provides for configuration of a per-service bandwidth bucket at the intermediate proxy node for reserving and tracking utilization of the guaranteed minimum bandwidth of the intermediate proxy node reserved to process messages associated with the service.

13. The system of claim 11 GTBS configuration interface provides for configuration of aa plurality of different per-service bandwidth buckets at the intermediate proxy node for reserving and tracking utilization of reserved minimum bandwidths of the intermediate proxy node available to be used by messages associated with a plurality of different services.

14. The system of claim 11 wherein the intermediate proxy node comprises a service communications proxy (SCP) or a security edge protection proxy (SEPP).

15. The system of claim 11 wherein the intermediate proxy node comprises a service mesh node.

16. The system of claim 11 wherein the GTBS controller is configured to identify the first message as being associated with the service using a uniform resource indicator (URI) in the first message.

17. The system of claim 11 wherein the intermediate proxy node includes a non-GTBS bucket usable for tracking bandwidth of the intermediate proxy node available to messages that are not associated with a service for which a guaranteed bandwidth of the intermediate proxy node is configured.

18. The system of claim 17 wherein the GTBS controller is configured to:
receive a second message;
determine that the second message is not associated with a service for which a guaranteed bandwidth of the intermediate proxy node is configured;
determine, using the non-GTBS bucket, that non-GTBS bandwidth is available for the second message; and
route the second message to a producer network function.

19. The system of claim 11 wherein the GTBS controller is configured to:
receive a second message;
identify the second message as being associated with the service for which the guaranteed minimum bandwidth is configured;
determine that a portion of the guaranteed minimum bandwidth is not available to process the second message;
determine a priority of the second message;
detect the presence of messages associated with the service and of lower priority than the second message that have been accepted for processing at the intermediate proxy node;
reject one of the messages associated with the service and of lower priority than the second message; and
route, by the intermediate proxy node and to a producer network NF that provides the service, the second message and update a message count for the service.

20. A non-transitory computer readable medium having stored thereon executable instructions that when executed by a processor of a computer control the computer to perform steps comprising:
configuring, at an intermediate proxy node, a guaranteed minimum bandwidth of the intermediate proxy node reserved to process messages associated with a service;
receiving a first message at the intermediate proxy node;
determining, by the intermediate proxy node, that the intermediate proxy node is in an overloaded state;
identifying, by the intermediate proxy node, the first message as being associated with the service for which the guaranteed minimum bandwidth is configured;
determining, by the intermediate proxy node, that a portion of the guaranteed minimum bandwidth for the service is available to process the first message; and
routing, by the intermediate proxy node and to a producer network function (NF) that provides the service, the first message and updating a message count for the service.

* * * * *

UNITED STATES PATENT AND TRADEMARK OFFICE
CERTIFICATE OF CORRECTION

PATENT NO. : 11,102,138 B2
APPLICATION NO. : 16/601371
DATED : August 24, 2021
INVENTOR(S) : Krishan et al.

It is certified that error appears in the above-identified patent and that said Letters Patent is hereby corrected as shown below:

On the Title Page

On page 2, Column 2, under item (56) Other Publications, Line 28, delete "Profect;" and insert -- Project; --, therefor.

On page 3, Column 2, under item (56) Other Publications, Line 17, delete "reliable" and insert -- Reliable --, therefor.

In the Specification

In Column 4, Line 6, delete "aa" and insert -- a --, therefor.

In Column 9, Line 60, after "scenarios)" insert -- . --.

In Column 11, Line 19, delete "PO" and insert -- P0 --, therefor.

In Column 12, Line 34, after "rejected" insert -- . --.

In Column 12, Line 38, after "message" insert -- . --.

In Column 12, Line 49, after "message" insert -- . --.

In Column 12, Line 54, after "Svc-X" insert -- . --.

In Column 12, Line 58, after "Svc-X" insert -- . --.

In Column 13, Line 43, after "rejected" insert -- . --.

In Column 13, Line 53, after "message" insert -- . --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*

In the Claims

In Column 18, Line 65, in Claim 13, delete "aa" and insert -- a --, therefor.